United States Patent
Cameron

(10) Patent No.: US 11,151,135 B1
(45) Date of Patent: Oct. 19, 2021

(54) APPARATUS AND METHOD FOR UTILIZING PRE-COMPUTED RESULTS FOR QUERY PROCESSING IN A DISTRIBUTED DATABASE

(71) Applicant: Cloudera, Inc., Palo Alto, CA (US)

(72) Inventor: Douglas J. Cameron, Santa Cruz, CA (US)

(73) Assignee: Cloudera, Inc., Palo Alto, CA (US)

( * ) Notice: Subject to any disclaimer, the term of this patent is extended or adjusted under 35 U.S.C. 154(b) by 277 days.

(21) Appl. No.: 15/230,240

(22) Filed: Aug. 5, 2016

(51) Int. Cl.
*G06F 16/178* (2019.01)
*G06F 16/2453* (2019.01)
*G06F 16/951* (2019.01)

(52) U.S. Cl.
CPC ...... *G06F 16/24539* (2019.01); *G06F 16/178* (2019.01); *G06F 16/24542* (2019.01); *G06F 16/951* (2019.01)

(58) Field of Classification Search
CPC ... G06F 17/30174; G06F 16/13; G06F 16/178
See application file for complete search history.

(56) References Cited

U.S. PATENT DOCUMENTS

| | | | | |
|---|---|---|---|---|
| 6,532,470 | B1* | 3/2003 | Cochrane | G06F 17/30575 |
| 6,845,466 | B2* | 1/2005 | Gold | G06F 11/006 |
| | | | | 711/115 |
| 7,822,712 | B1* | 10/2010 | Robinson | G06F 17/30383 |
| | | | | 707/624 |
| 8,560,523 | B2* | 10/2013 | Larson | G06F 17/30935 |
| | | | | 707/705 |
| 2003/0188160 | A1* | 10/2003 | Sunder | G06F 8/65 |
| | | | | 713/165 |
| 2004/0172551 | A1* | 9/2004 | Fielding | G06F 21/564 |
| | | | | 726/24 |
| 2005/0182958 | A1* | 8/2005 | Pham | G06F 21/51 |
| | | | | 726/22 |
| 2010/0062844 | A1* | 3/2010 | Crowder, Jr. | G06F 21/57 |
| | | | | 463/29 |

(Continued)

OTHER PUBLICATIONS

Chidlovskii et al., "Semantic caching of Web Queries", 2000, The VLDB Journal. (Year: 2000).*

*Primary Examiner* — Apu M Mofiz
*Assistant Examiner* — Sheryl L Holland
(74) *Attorney, Agent, or Firm* — Staniford Tomita LLP

(57) ABSTRACT

A pre-computed result module computes a result prior to receiving a query. The pre-computed result module includes instructions executed by a processor to assess a pre-computation query to designate each identified database source that contributes to the answer to the pre-computation query and corresponding database source metadata. A metadata signature is computed for each identified database source to create a store of identified database sources and corresponding metadata signatures. The query is evaluated to identify accessed database sources responsive to the query. A current metadata signature for each accessed database source is compared to the metadata signatures to identify each updated database source. Re-computed results are formed for each updated database source. Pre-computed results are utilized for each database source that is not updated. A response is supplied to the query using the re-computed results and the pre-computed results.

6 Claims, 2 Drawing Sheets

(56) References Cited

U.S. PATENT DOCUMENTS

2012/0221546 A1* 8/2012 Rafsky .................. G06F 16/951
707/709
2013/0311421 A1* 11/2013 Erdogan ........... G06F 17/30578
707/609
2016/0306972 A1* 10/2016 Cui ....................... G06F 21/564

* cited by examiner

APPARATUS AND METHOD FOR UTILIZING PRE-COMPUTED RESULTS FOR QUERY PROCESSING IN A DISTRIBUTED DATABASE

FIELD OF THE INVENTION

This invention relates generally to distributed databases. More particularly, this invention relates to the utilization of pre-computed results for query processing in a distributed database.

BACKGROUND OF THE INVENTION

A distributed database is a database in which storage devices are not all attached to a common processing unit, such as a central processing unit. Instead, multiple computers are used to implement a distributed database management system. The multiple computers may be located in the same physical location, or they may be dispersed over a network of disaggregated interconnected computers. There is typically a master node and a set of slave or worker nodes that store partitions of the distributed database. Each partition may include a set of source files. Some tables in the database may not be partitioned (one could view these as having a single partition). Note also that even for one partition, many files can exist for that partition and be distributed amongst the processing nodes.

Database systems often use pre-computed results so that multiple queries which reference the same data can be serviced without repeated scans of the input data. As new data is loaded into the database these pre-computed results can become stale and queries serviced from them would be incorrect.

A full re-computation of all pre-computed results can be an expensive operation so it is desirable to only re-compute the results that have actually changed. If one does not control the data source, then identifying changes in data can be challenging.

Large databases often store table data split into partitions identified by a key such as the day corresponding to the data in the partition. This allows sub-ranges of the table to be directly located without requiring a full table scan.

If the pre-computed results are stored in a table which is also organized into partitions, such that there is a direct correspondence between each result partition and one or more input partitions, then only the result partitions whose input partitions have changed need to be recomputed. Identifying partitions with changed data is challenging in the case where the data source is controlled by another entity, which may or may not actively provide an indication of a change in data.

Accordingly, there is a need to establish techniques to identify stale pre-computed data and efficiently update such data.

SUMMARY OF THE INVENTION

A pre-computed result module computes a result prior to receiving a query. The pre-computed result module includes instructions executed by a processor to assess a pre-computation query to designate each identified database source that contributes to the answer to the pre-computation query and corresponding database source metadata. A metadata signature is computed for each identified database source to create a store of identified database sources and corresponding metadata signatures. The query is evaluated to identify accessed database sources responsive to the query. A current metadata signature for each accessed database source is compared to the metadata signatures to identify each updated database source. Re-computed results are formed for each updated database source. Pre-computed results are utilized for each database source that is not updated. A response is supplied to the query using the re-computed results and the pre-computed results.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The invention uses file system meta-data that is an artifact of the database implementation (i.e., it is maintained automatically without specific database involvement) to track which inputs to a computation have changed. For example, in a database system that stores table data within a file system structure with different table partitions stored in different sets of files, one can associate a signature, such as a cyclic redundancy check calculation over file system metadata (e.g., file names, file sizes, file update timestamps) to determine which (if any) partitions of the input table(s) must be re-processed.

Other aspects of the invention include the ability to determine which input files contribute to each pre-computed result item, the ability to group result items according to which set of input files they are produced by, the ability to generate a signature that is a function of the file meta-data for each set of input files, and the ability to store this generated signature along with the corresponding generated result. In sum, the system allows for optimized re-computation of result items when a subset of input files has been modified.

Figure 1:
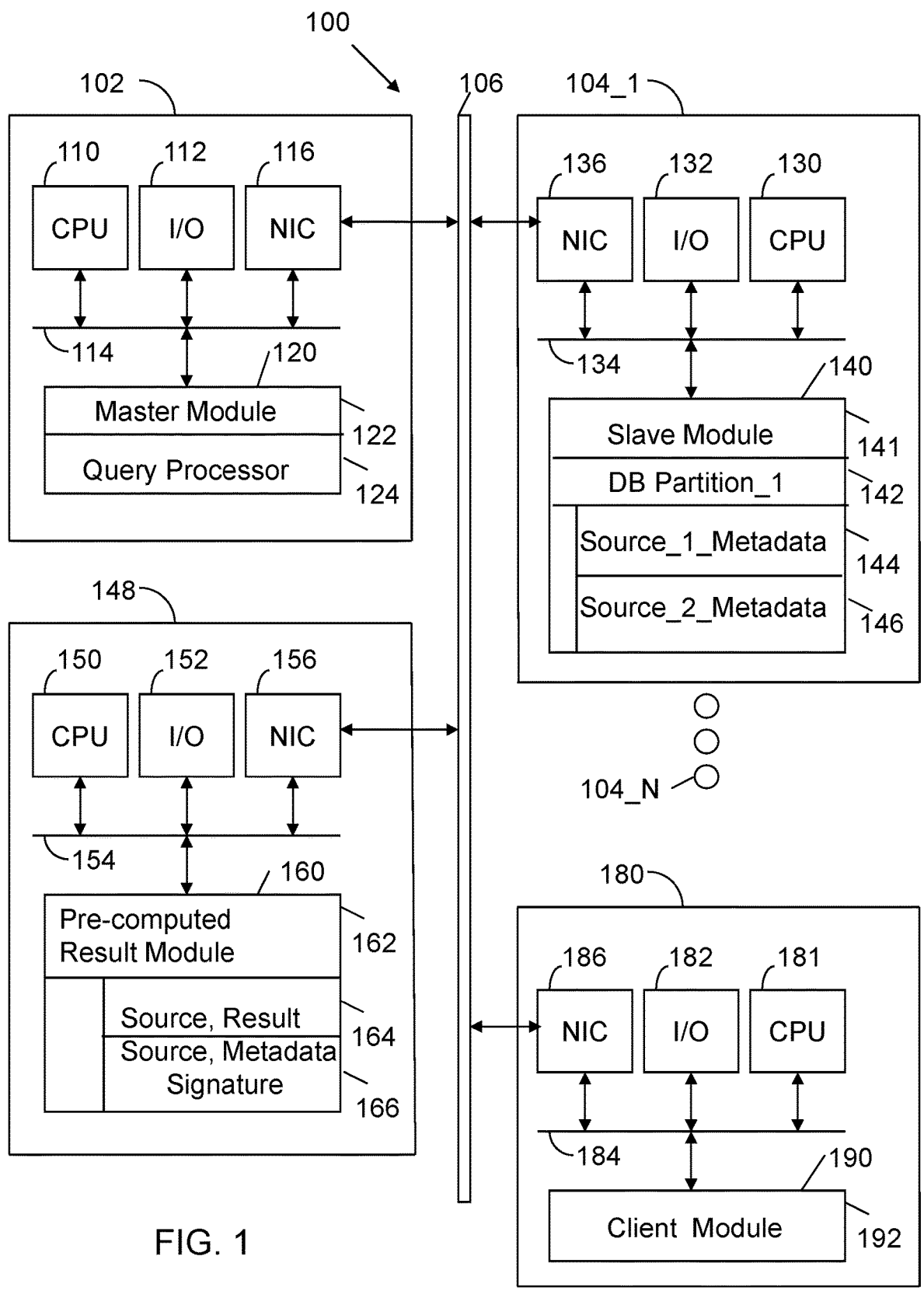
FIG. 1 illustrates a system configured in accordance with an embodiment of the invention.

FIG. 1 illustrates a system 100 configured in accordance with an embodiment of the invention. The system 100 includes a master machine 102 in communication with a set of slave or worker machine 104_1 through 104_N via a network 106, which may be any combination of wired and wireless networks. The master machine 102 includes standard components, such as a central processing unit 110 in communication with a set of input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 includes instructions executed by the central processing unit 110. In particular, the memory 120 stores a master module 122, which includes executable instructions to perform master node operations associated with a distributed database. The memory 120 also stores a query processor 124, which processes queries by applying them across the distributed database implemented across the worker nodes 104_1 through 104_N.

Worker machine 104_1 also includes standard components, such as a central processing unit 130, input/output devices 132, a bus 134, a network interface circuit 136 and a memory 140. The memory 140 stores a slave module 141 to implement slave processing at the direction of the master machine 102. The memory 140 also stores a database partition 142 of a distributed database. The distributed database partition 142 may include individual source files, which have source metadata, such as source_1_metadata 144 and source_2_metadata 146, examples of which are provided below.

A query support machine 148 may also be connected to network 106. The query support machine 148 also includes standard components, such as a central processing unit 150, input/output devices 152, a bus 154, a network interface circuit 156 and a memory 160. The memory 160 stores a pre-computed result module 162. As its name implies, the pre-computed result module 162 pre-computes results that are likely to be requested. In addition to storing a pre-computed result, the pre-computed result module 162 stores the individual components (data sources) that contribute to the pre-computed result. These individual components include a set of source files, and the result associated with the source files 164. In addition, the pre-computed result module 162 stores the source files contributing to the pre-computed result and a metadata signature 166 for the source files. Note that the query support functionality can exist within the master machine. Note also that the pre-computed results are often distributed across the worker machines in the same manner as the base tables and that the worker machines can also perform operations on the pre-computed results.

FIG. 1 also illustrates a client machine 180 connected to network 106. The client machine 180 includes standard components, such as a central processing unit 181, input/output devices 182, a bus 184, a network interface circuit 186 and a memory 190. The memory 190 stores a client module 192, which allows the client machine to pass queries to the query processor 124 of the master machine 102, which executes the query across the distributed database implemented across worker machines 104_1 through 104_N. Alternately or in addition, the client machine may apply the query to the query support machine 148, which may implement a separate query processor in addition to the pre-computed result module 162. Indeed, the components of query support machine 148 may be incorporated into master machine 102 and vice versa.

Figure 2:
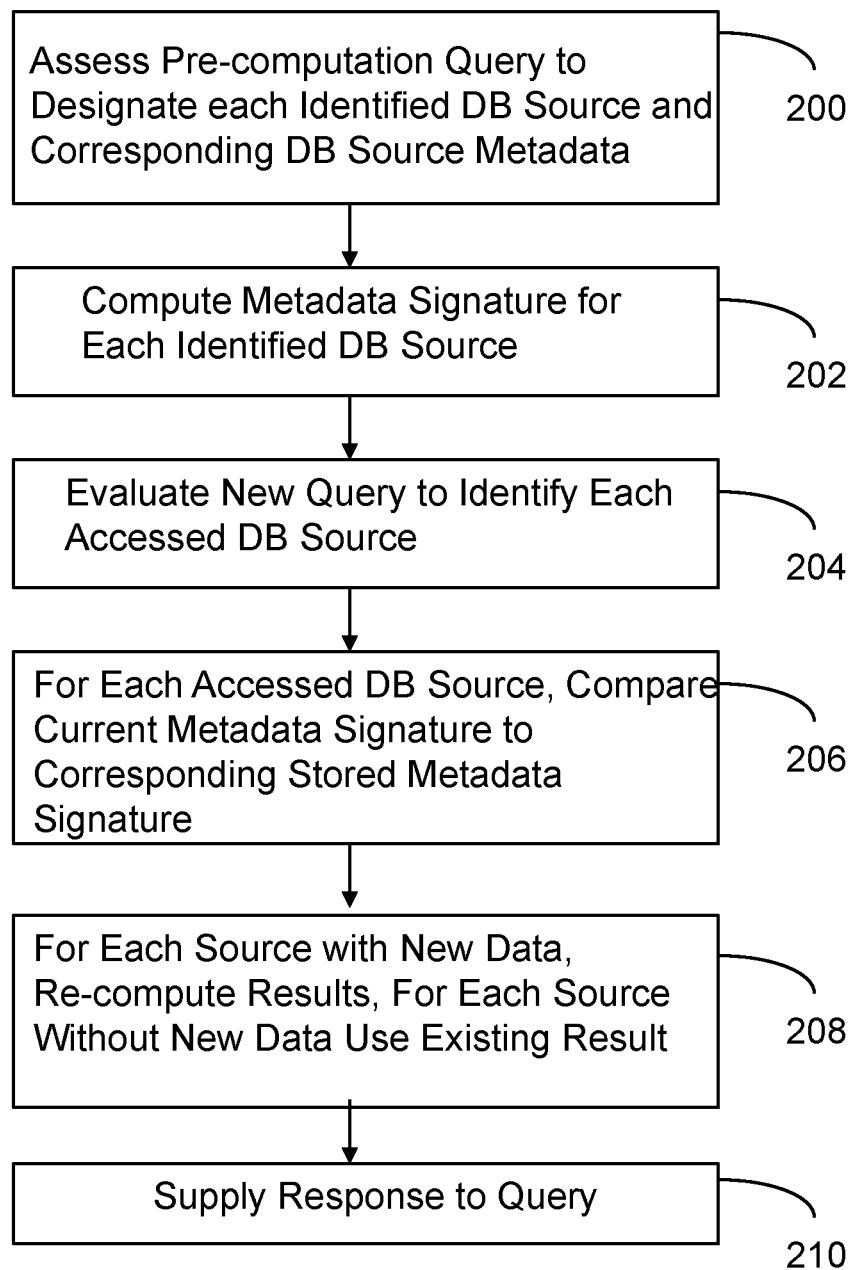
FIG. 2 illustrates processing operations associated with an embodiment of the invention.

FIG. 2 illustrates query processing operations performed by an embodiment of the pre-computed result module 162. Initially, a pre-computation query is assessed to designate each identified database source and corresponding database partition metadata 200. The database sources may be database files, as discussed in the example below. The pre-computation query is assessed to identify database files. The database files are not necessarily designated in the query directly; rather, the database files are typically indirectly referenced as the files that make up the base table(s) named in the query.

A metadata signature for each identified database source is then computed 202. The metadata signature is computed to identify changes in source data. The query support machine 148 may not have control over the source data. Therefore, it needs another approach to identify changes in the source data. The invention leverages the inherent utilization of metadata to track changes in data, as demonstrated below.

At this point, there is an aggregate pre-computed result, a list of sources contributing to the pre-computed result (and the result contributed by each source), and a list of metadata signatures for the sources. An example of this is provided below.

A new query is then evaluated to identify accessed database sources 204. More particularly, the new query is evaluated to determine whether it corresponds to a pre-computed result. If so, the database sources contributing to the pre-computed result are identified. Then, for each database source, the current metadata signature for the source is compared to the corresponding stored metadata signature 206. For each partition with new data, results are re-computed for that partition and for each partition without new data the existing pre-computed result is used 208. A response is then supplied to the query 210. Note that the pre-computed results are not necessarily final results. For example, one can use pre-computed total sales per-day/per-store to compute total sales per day. Thus, the reference to supplying a response to the query does not necessarily mean that the pre-computed results are themselves part of the final answer returned to the client. Rather, in most cases these pre-computed results are further processed or combined to produce the final result set.

Consider the case of a database table named 'sales' that contains a record with details of each sale made by a retail company:

| Year | Month | Day | Time | Prod | Amount | Store | Salesperson |
|---|---|---|---|---|---|---|---|
| 2014 | 1 | 1 | 09:02 | Shoes-xxx | 29.95 | Campbell CA - 1 | Tom |
| 2014 | 1 | 1 | 09:01 | Shirt-xxx | 19.95 | Campbell CA - 1 | Fred |

In this example, the sales data could be stored in a partitioned manner so that the data entries for each day are stored in separate files. Note that below, the partitioning values (year, month, day) are embedded in the file name:

| File Name | File Size | Update Time | |
|---|---|---|---|
| /tables/sales/2014/1/1/data.00 | 8192000 | 2014 Jan. 31 | 15:29 |
| /tables/sales/2014/1/2/data.00 | 4096000 | 2014 Feb. 28 | 15:31 |
| ... | | | |
| /tables/sales/2014/6/14/data.00 | 1024000 | 2014 Jun. 14 | 15:11 |

In this case, it could be useful to maintain pre-computed values like the total sales by store so that these values could be quickly accessed without repeated processing of all sales records. Such a data table, partitioned using the same (year, month, day) scheme as the sales table, would look like:

| Year | Month | Day | Total | Store |
|---|---|---|---|---|
| 2014 | 1 | 1 | 123321.44 | Campbell CA - 1 |
| 2014 | 1 | 1 | 97734.12 | San Jose CA - 1 |
| ... | | | | |
| 2014 | 1 | 2 | 487490.23 | Campbell CA - 1 |
| 2014 | 1 | 2 | 176438.89 | San Jose CA - 1 |
| ... | | | | |

Such a table may be formed in response to a pre-computation query that specifies each identified database source (e.g., by year, month, day). Each such database source has corresponding database source metadata (e.g., file name, file size, file update timestamp).

These precomputed results could be stored in table 'results', organized with the same partitioning as the 'sales' table above. In order to track any changes of input data for each partition, a checksum calculation can be performed on the metadata for each input file contributing to a particular result file. The checksum is operative as a metadata signature.

| File Name | Partition Key | Input Checksum |
|---|---|---|
| /tables/results/2014/1/1/data.00 | 2014 Jan. 1 | 0x12345678 |
| /tables/results/2014/1/2/data.00 | 2014 Jan. 2 | 0x44332211 |
| ... | | |
| /tables/results/2014/6/14/data.00 | 2014 Jun. 14 | 0xABCD1234 |

Now if new data is loaded into the system, for example the sales records for the next day and perhaps some additional sales records for the previous day that were left out for some reason (like one store's computer system being down), the updated metadata for table 'sales' might look like:

| File Name | File Size | Update Time | |
|---|---|---|---|
| /tables/sales/2014/1/1/data.00 | 8192000 | 2014 Jan. 31 | 15:29 |
| /tables/sales/2014/1/2/data.00 | 4096000 | 2014 Feb. 28 | 15:31 |
| ... | | | |
| /tables/sales/2014/6/14/data.00 | 1024000 | 2014 Jun. 15 | 15:33 ← Changed metadata |
| /tables/sales/2014/6/15/data.00 | 2048000 | 2014 Jun. 15 | 15:34 ← New file |

Running the checksum calculation on this metadata to see what pre-computed results need updating gives:

| File Name | Partition Key | Stored Checksum | Input Checksum |
|---|---|---|---|
| /tables/results/2014/1/1/data.00 | 2014 Jan. 1 | 0x12345678 | 0x12345678 |
| /tables/results/2014/1/2/data.00 | 2014 Jan. 2 | 0x44332211 | 0x44332211 |
| ... | | | |
| /tables/results/2014/6/14/data.00 | 2014 Jun. 14 | 0xABCD1234 | 0xEEFF4433 |
| — | 2014 Jun. 15 | — | 0x66778899 |

The above table shows that one needs to re-compute results for only the last two partition values because the stored checksum values for those partitions are either different or missing.

Observe that one only re-computes the result sets for which the input data has changed. Advantageously, one is able to determine which of these re-computations are required very quickly by looking only at file system metadata and not examining actual file contents. The file system metadata is automatically updated when the underlying file contents changes in any way. Thus, there is no specific additional logic that is required at the database level.

More than one input file can contribute to any particular result. Thus, the partitioning scheme of the results does not need to be an exact match of the input data partitioning. The key point is the ability to determine exactly the set of input files contributing to each result set.

The checksum calculation can vary in complexity from simple (e.g., a logical exclusive-OR function), intermediate (e.g., a cyclic redundancy check), to advanced (e.g., a message digest algorithm, such as MD5). The more complex the checksum calculation, the better it is at detecting changes in the input data.

In the case of a non-partitioned table (i.e., a table with a single partition), doing an update of the pre-computed results does require a full scan of the input base table files. However, one still gets the benefit of knowing whether the pre-computed results are fresh and can be used to answer queries against the base table.

The invention is disclosed in the context of a distributed file system. However, the same techniques may be used in connection with a relational schema. For example, tables and columns implicated by a query may be identified and a metadata signature may be formed based upon metadata associated with the table, column, rows, table size and table timestamp.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising;
   a database with multiple data sources, wherein the database is a distributed database implemented on a collection of network connected worker machines, each worker machine maintaining a respective database partition storing individual source files and associated source metadata identifying a file name, file size, update timestamp and corresponding database partition; and a query support machine coupled to the worker machines and having a pre-computed result module to pre-compute results responsive to one or more queries from a networked client computer, and store the pre-computed results in a table of the database, wherein the pre-computed result module includes instructions executed by a processor to:

execute a pre-computation query to determine which input files contribute to each of the pre-computed results, wherein the pre-computation query indirectly references database files constituting base tables named in the query and stored in one or more database partitions of the worker machines;

group pre-computed results according to corresponding input files;

generate a metadata checksum from the associated source metadata for each corresponding input file;

store the generated metadata checksum for each corresponding input file with a corresponding pre-computed result;

evaluate a new query from the client to identify an accessed data source;

determine whether a result of the new query corresponds to a pre-computed result by comparing a current metadata checksum of the accessed data source to a stored generated metadata checksum for a pre-computed result;

use the pre-computed result as the result of the new query if the current metadata checksum matches the stored generated metadata checksum; otherwise update the generated metadata checksum for input files changed or created after the pre-computation query to generate stored updated metadata checksums, and re-computing the result to generate a re-computed result using a corresponding stored updated metadata checksum; and return at least one of the pre-computed result or re-computed result to the client in response to the new query.

2. The system of claim 1 wherein the accessed data source is a file, and wherein the file name of the file has embedded in it partitioning values of a database partition storing the file, the partitioning values comprising a year, month, and day of the file.

3. The system of claim 2 wherein the metadata is automatically updated whenever the file is changed, and wherein the corresponding metadata checksum is also automatically changed.

4. The system of claim 3 wherein the stored metadata checksum and the current metadata checksum each comprise a checksum value based upon one of an exclusive-OR function, a cyclic redundancy check, and a message-digest algorithm.

5. The system of claim 1 further comprising a master machine coupled to the client machine connected to the network to perform master node operations associated with the distributed database.

6. The system of claim 5 wherein the query support machine is implemented in the master machine.

* * * * *